(12) United States Patent
Kondo et al.

(10) Patent No.: US 6,198,520 B1
(45) Date of Patent: Mar. 6, 2001

(54) COLOR LIQUID CRYSTAL DISPLAY

(75) Inventors: Katsumi Kondo, Hitachinaka; Keiko Inoue; Shigeru Matsuyama, both of Mobara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/011,175

(22) PCT Filed: Aug. 2, 1996

(86) PCT No.: PCT/JP96/02180

§ 371 Date: Feb. 2, 1998

§ 102(e) Date: Feb. 2, 1998

(87) PCT Pub. No.: WO97/06463

PCT Pub. Date: Feb. 20, 1997

(30) Foreign Application Priority Data

Aug. 3, 1995 (JP) .................................................. 7-198349

(51) Int. Cl.[7] ........................ G02F 1/1335; G02F 1/1343
(52) U.S. Cl. ................................. 349/141; 349/106
(58) Field of Search ................................. 349/141, 143, 349/106

(56) References Cited

U.S. PATENT DOCUMENTS

| | | | | |
|---|---|---|---|---|
| 4,560,241 | * | 12/1985 | Stolov et al. | 350/339 |
| 5,600,464 | * | 2/1997 | Ohe et al. | 349/123 |
| 5,852,485 | * | 12/1998 | Shimada et al. | 349/141 |
| 5,914,761 | * | 6/1999 | Ohe et al. | 349/141 |

* cited by examiner

Primary Examiner—Kenneth Parker
(74) Attorney, Agent, or Firm—Antonelli, Terry, Stout & Kraus, LLP

(57) ABSTRACT

One substrate of a color liquid crystal display device includes a plurality of common electrodes, a plurality of pixel electrodes disposed between the plurality of common electrodes, color filters disposed between the common electrodes and the pixel electrodes, an orientation control layer disposed on the color filters for controlling the orientation of liquid crystal molecules of a liquid crystal layer, and black matrixes for shading boundaries of the color filters. An electric field parallel to the substrate is generated in the liquid crystal layer by applying a voltage between the common electrodes and the pixel electrodes.

16 Claims, 8 Drawing Sheets

COLOR LIQUID CRYSTAL DISPLAY

TECHNICAL FIELD

The present invention relates to a color liquid crystal display having a wide angle of visibility and also having no unevenness of luminance, and particularly to a color liquid crystal display intended to improve productivity upon production using a large-sized substrate.

BACKGROUND ART

In a prior art matrix type color liquid crystal display, at least part of electrodes for driving liquid crystal are formed on one of a pair of opposed substrates and color filters and black matrixes are formed on the other one of the opposed substrates. In a thin film transistor (TFT) type liquid crystal display, which is a typical liquid crystal display, thin film transistors and a group of interconnection electrodes are formed on one substrate, and color filters and black matrixes are formed on the other substrate.

In such a prior art display in which thin film transistors and color filters are respectively formed on a pair of opposed substrates, when a cell is formed by superimposing the pair of substrates to each other, it is required to accurately align a large number of corresponding pixels to each other. However, as a substrate size becomes larger, there may easily occur offset of pixels between the two substrates due to thermal expansion of the substrates or the like. For this reason, alignment of the pixels must be performed for a long period of time using a high precision aligner, to thereby significantly degrade productivity.

On the other hand, to solve such a problem on alignment of pixels, a technique has been proposed, for example, in Japanese Patent Laid-open Nos. Hei 2-54217 and Hei 2-302727, wherein thin film transistors, a group of interconnection electrodes, color filters, and black matrixes are formed on one substrate. In the technique disclosed in the above documents, however, planar pixel electrodes and a counter electrode are formed on the substrates in such a manner as to hold liquid crystal therebetween. Accordingly, the color filters on the pixel electrodes act as capacitance elements connected in series to the liquid crystal, to thereby significantly reduce a voltage applied to the liquid crystal. In general, liquid crystal has a dielectric constant being as very high as about 10 (average value), while a resin material forming the color filters has a dielectric constant being as low as about 3 to 6. As a result, even if the color filter is formed to a thickness smaller than that of the liquid crystal, it exerts a large effect on a drop in voltage applied to the liquid crystal.

Further, WO91/10936, U.S. Pat. No. 4,345,249, and EPO588562A2 propose a method of applying an electric field to liquid crystal in the direction substantially parallel to a substrate plane (horizontal electric field applying method). In this method, since major axes of liquid crystal molecules are substantially in parallel to the substrate plane and thereby they are not raised, the visibility is not dependent on a viewing angle, that is, the angle of visibility becomes wider. The method disclosed in the above documents fails to examine a reduction in unevenness of luminance, improvement of numerical aperture, and improvement of productivity.

An object of the present invention is to provide a color liquid crystal display having a high productivity.

Another object of the present invention is to provide a color liquid crystal display having no unevenness of luminance.

A further object of the present invention is to provide a color liquid crystal display having a high numeral aperture.

DISCLOSURE OF INVENTION

One substrate of a color liquid crystal display of the present invention may include a plurality of common electrodes, a plurality of pixel electrodes disposed between the plurality of common electrodes, color filters disposed between the common electrodes and the pixel electrodes, and an orientation control layer for controlling orientation of liquid crystal molecules in a liquid crystal layer disposed on the color filters. When a voltage is applied between the common electrodes and the pixel electrodes, an electric field in parallel to the substrate is generated in the liquid crystal layer.

According to one embodiment of the present invention, the one substrate further includes black matrixes for shading boundaries of the color filters. A planarizing film may be formed between the orientation control film and the color filters. Further, the color filers may be formed in such a manner as to cover the pixel electrodes.

According to another embodiment of the present invention, letting d be a thickness of the liquid crystal layer and $\Delta n$ be an anisotropy in refractive index, the product $\Delta n \times d$ is in a range of 0.21 to 0.37 $\mu$m. The orientation control layer is preferably formed of an organic polymer film, and at least one of the color filter, orientation control layer, and planarizing film is preferably made from a photosensitive polymer.

Further, one substrate of a color liquid crystal display of the present invention may include a plurality of scanning interconnections, a plurality of signal interconnections crossing said scanning interconnections in a matrix, and a plurality of thin film transistors formed in such a manner as to correspond crossing points between said scanning interconnections and said signal interconnections. Pixels can be defined by regions surrounded by said plurality of scanning interconnections and said plurality of signal interconnections.

Each of said pixels may include a plurality of common electrodes connected to a common interconnection for connecting a number of said pixels to each other, and at least one pixel electrode disposed between said common electrodes and connected to a corresponding one of said thin film transistors.

Adjacent ones of said plurality of common electrodes may be disposed in such a manner as to surround a corresponding one of said signal interconnections between adjacent ones of said pixels. Each color filter may be formed between said plurality of common electrodes and said pixel electrode, and an orientation control layer may be disposed on said color filters for controlling orientation of liquid crystal molecules of said liquid crystal layer.

Each black matrix may be formed on one of said plurality of signal interconnections and ones of said common electrodes adjacent to said one signal interconnection.

According to the color liquid crystal display of the present invention, the active matrix elements for switching liquid crystal, all of the group of electrodes, the color filters for color display, and the black matrixes for improving a color purity and contract ratio are formed on one substrate. To drive liquid crystal, there is adopted a horizontal electric field applying method of applying an electric field to the liquid crystal in the direction substantially parallel to a substrate plane.

First, since the color filters are disposed between the electrodes, irregularities of the liquid crystal orientation control layer formed on the color filters are moderated, to establish a uniform cell gap, thereby improving unevenness of luminance.

Further, according to the horizontal electric field applying method of the present invention, the electrodes for driving liquid crystal are all in linear shapes and are formed on one substrate. Accordingly, capacitance components of all of the elements formed through the adjacent electrodes are formed in a pattern in which equivalent circuits arranged in parallel are mixed with equivalent circuits arranged in series. However, the capacitance components of the equivalent circuits of the insulators arranged in series to the capacitance component of the liquid crystal are made significantly small. The reason for this is dependent on the facts that in the general design, the interval (about 10 to 30 μm) between the adjacent electrodes is significantly wider than the thickness (about 2 to 6 μm) of the liquid crystal layer; that lines of electric force are almost horizontal components; and that the dielectric constant of the liquid crystal is larger than that of the resin material forming the color filters and the like. In addition, the lines of electric force pass through a shorter route toward the medium having a high dielectric constant.

Accordingly, even when the color filters each having a thickness being as larger as 1 to 3 μm are formed on the electrodes, the horizontal component is sufficiently large yet and thereby a reduction in effective voltage applied to the liquid crystal layer is small. Thus, in the horizontal electric field applying method, the effective voltage is less affected by the other capacitance components, and consequently, an electric limitation due to formation of the color filters on the electrode substrate side is small.

According to the present invention, since the elements requiring alignment, for example, electrodes and color filters, are disposed on one substrate, it is sufficient to dispose only an orientation film on a counter substrate. Although an accuracy in patterning elements such as electrodes and color filters on a substrate is generally about 1 μm, an accuracy in alignment of a pair of substrates is about 3 to 5 μm. This is because, at a step of alignment of substrates, there occurs an uneven distribution of temperature in a large sized substrate, and consequently the substrate is thermally expanded and deformed. In the case where electrodes and color filters are respectively formed on separate substrates in accordance with the prior art display, sizes of black matrixes are designed to be large on assumption of a deviation in alignment of the substrates, as a result of which the numerical aperture must be designed at a low value.

According to the present invention, such an alignment is not required, so that productivity of the display is improved. The numerical aperture can be also improved because a deviation in alignment of substrates is not required to be taken into consideration.

Further, since an orientation film having a thickness as very thin as several tens nm to several hundreds nm may be basically formed on the counter substrate, an extremely flat surface can be obtained. As a result, it is possible to reduce a variation in gap between the substrates, that is, a thickness of the liquid crystal layer, and hence to lower unevenness of luminance.

BRIEF DESCRIPTION OF DRAWINGS

FIGS. 10(a) and 10(b) are typical views of a unit pixel portion in Embodiment 2, wherein FIG. 10(a) is a plan view, and FIG. 10(b) is a sectional view; and FIG. 11 is a typical views of a unit pixel portion in Comparative Example, wherein FIG. 11(a) is a plan view, and FIG. 11(b) is a sectional view.

BEST MODE FOR CARRYING OUT THE INVENTION

First, a configuration and an operational principle of a horizontal electric field applying method of the present invention will be described by example of a double refraction mode.

Figure 3:
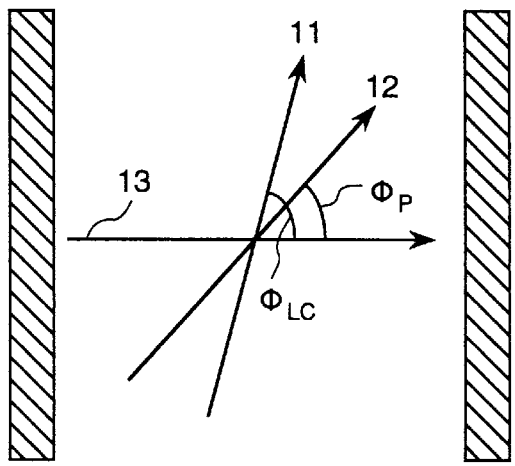
FIG. 3 is a diagram showing an angle between an electric field direction and orientation of a major axis of a liquid crystal molecule and an angle between the electric field direction and a polarized light axis of a polarizing plate.

FIG. 3 illustrates definition of an angle $\phi_P$ between a direction 12 of a transmitting axis of a polarizing plate and a direction of an electric field 13, and an angle $\phi_{LC}$ between an orientation 11 (rubbing direction) of a major axis (optical axis) of a crystal molecule in the vicinity of an interface with a substrate and the direction of the electric field 13.

FIGS. 4(a) to 4(d) are views each showing action of liquid crystal in a liquid crystal panel driven by the horizontal electric field applying method, wherein FIGS. 4(a) and 4(b) are sectional side views, and FIGS. 4(c) and 4(d) are plan views. It should be noted that in the entire display, stripe-shaped electrodes are formed in a matrix to form a plurality of pixels; however, only a unit pixel portion is shown in FIGS. 4(a) to 4(d).

FIG. 4(a) shows a state of liquid crystal upon application of no voltage, and FIG. 4(c) shows a plan view of FIG. 4(a). Stripe electrodes 2 and 3 are formed inside a pair of transparent substrates 1 and 1', and orientation control layers 8 and 8' are formed on the substrates 1 and 1' respectively. Between both the substrates is held a liquid crystal composition layer 10. A bar-like liquid crystal molecule 6 is, upon application of no voltage, oriented along the orientation 11 shown by an arrow by means of the orientation control layers 8 and 8' such that the above angle $\phi_{LC}$ is in a range of $45° \leq |\phi_{LC}| < 90°$ with respect to the longitudinal direction of the stripe-shaped electrodes. In addition, it is assumed that the anisotropy in dielectric constant of the liquid crystal is positive.

Next, as shown in FIGS. 4(b) and 4(d), when the electric field 13 is applied between the electrodes 2 and 3, the liquid crystal molecule 6 is changed in its orientation in such a manner as to be close to the direction of the electric field 13.

Figure 4:
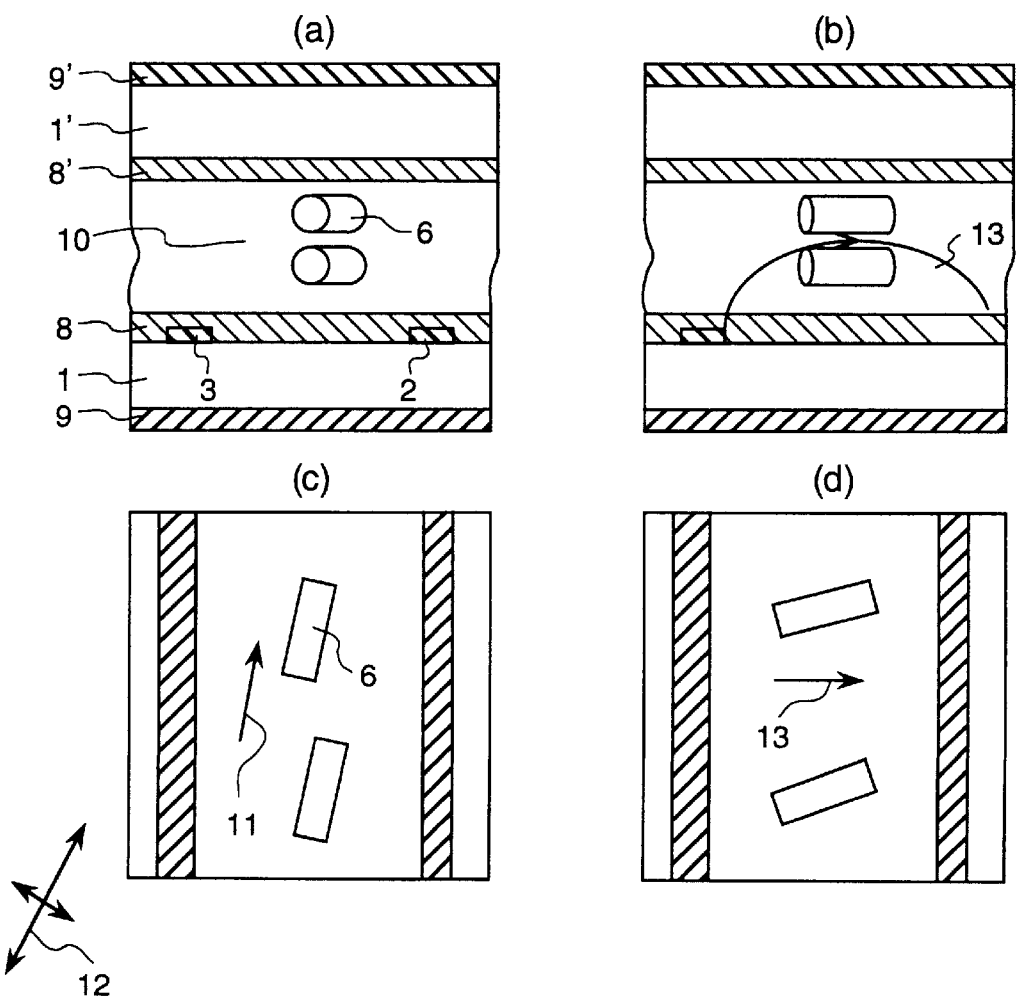
FIGS. 4(a) to 4(d) are typical diagrams illustrating actions of liquid crystal in a liquid crystal display driven by a horizontal electric field applying method.

Although the liquid crystal molecule 6 having a positive anisotropy in dielectric constant is used in the example shown in FIG. 4, it may be replaced with the liquid crystal molecule 6 having a negative anisotropy in dielectric constant. In such a case, the initial orientation state may be set such that the angle $\phi_{LC}$ is in a range of $0° \leq |\phi_{LC}| < 45°$ with respect to the vertical direction of the stripe electrodes.

In the display method using the double refraction mode, an intensity of transmission light observed in a state in which liquid crystal is held between polarizing plates crossing at right angles is proportional to sin $2(\pi \Delta n \times d/\lambda)$. Here, $\Delta n$ is double refraction (anistropy in refractive index) of a liquid crystal material, d is a thickness of the liquid crystal layer, and $\lambda$ is a wavelength of light. To maximize the intensity of the transmission light, a retardation term $\Delta n \times d$ may be set at $\lambda/2, 3\lambda/2, 5\lambda/2 \ldots$; however, to obtain the transmission light colored in white by suppressing the dependency of wavelength on the transmission light, the term $\Delta n \times d$ is preferably set at $\lambda/2$. To be more specific, in consideration of the light of a wavelength having a high luminous efficiency, for example 550 nm, the terms $\Delta n \times d$ becomes 0.28 $\mu$m. The term $\Delta n \times d$ may be practically in a range of 0.21 to 0.37 $\mu$m.

In general, the anisotropy $\Delta n$ in refractive index of a liquid crystal material having a positive anisotropy ($\Delta \epsilon$) is in the order of about 0.06 or more, and accordingly, to satisfy the above requirement for the term $\Delta n \times d$, the cell gap d is required to be set at a value being as very narrow as 5 $\mu$m or less.

Here, the double refraction mode has a problem that as compared with the rotatory polarization mode in which a polarizing plane of incident light is rotated along twisting, there may easily occur unevenness in a threshold value within a display plane depending on a slight variation in gap. That is, the horizontal electric field applying system using the double refraction mode needs a strictly uniform gap forming technique as compared with the vertical electric field applying system using the rotatory polarization mode.

However, electrodes and color filters are finely formed in complicated matrix patterns on a substrate plane constituting a liquid crystal display, and consequently, in some cases, steps in the order of about 0.5 $\mu$m to several $\mu$m are formed on the electrode substrate and color filter substrate. In particular, the steps become larger in the electrode substrate in which active elements such as thin transistors (TFTs) are formed in the pixel portions.

In general, a cell gap is controlled using particles of a spacer material which are scattered on a substrate. In this case, the cell gap is determined by the particle of the spacer material placed on the highest position of the substrate plane. For example, in order to fabricate a cell in which the gap in the display portion is 4 $\mu$m, the particle size of the spacer material must be selected to be smaller than the desired gap (4 $\mu$m in this case) even in consideration of the fact that about 10 to 20% of the particles of the spacer material are elastically deformed and crashed depending on steps formed on the substrate. In the case where the steps of the substrate are larger, the particle size of the spacer material must be selected to be very smaller than the target cell gap; however, when the particle size of the spacer material becomes small, a variation in the particle size becomes larger. In particular, in fabrication of a narrow gap liquid crystal display having a cell gap of 5 $\mu$m or less, it is difficult to uniformly control the cell gap, which tends to cause unevenness of luminance.

Hereinafter, there will be described embodiments of the present invention, which intend to form a uniform cell gap and to ensure a high productivity.

Embodiment 1

Figure 1:
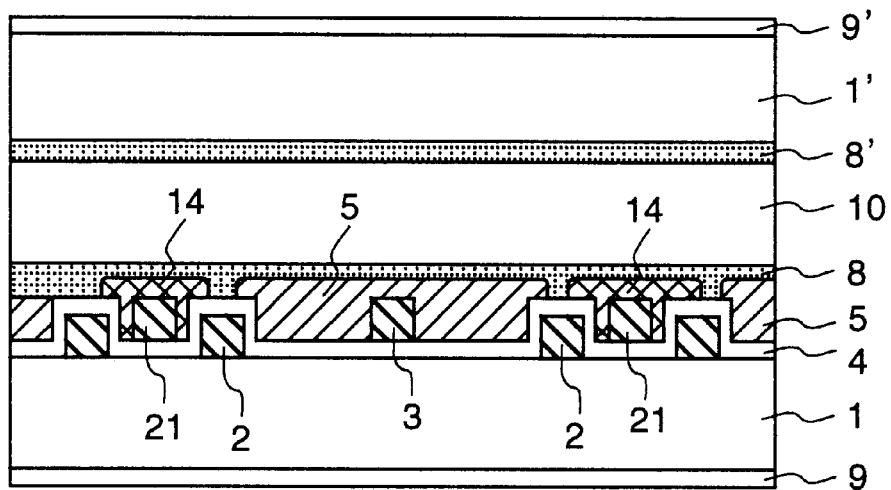
FIG. 1 is a typical sectional view of a unit pixel portion of a color liquid crystal display of the present invention.
Figure 2:
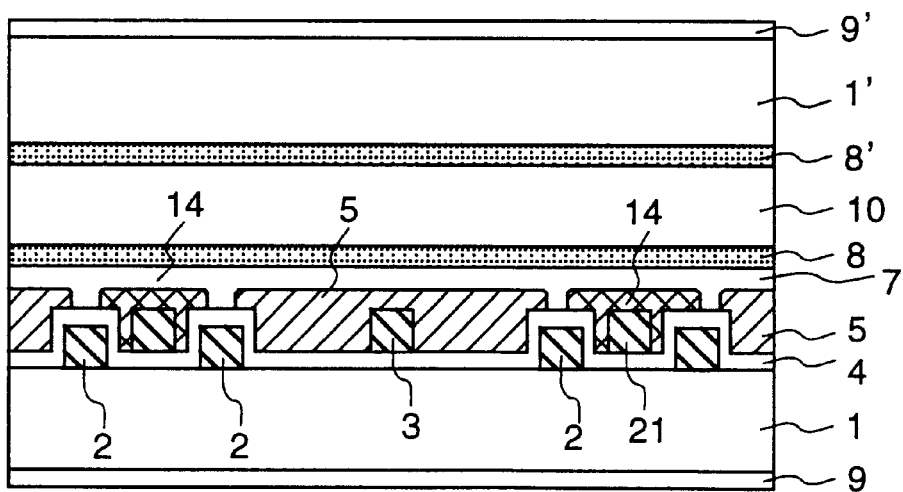
FIG. 2 is a typical sectional view of another unit pixel portion of the color liquid crystal display of the present invention.

FIGS. 1 and 2 are schematic views showing one embodiment of a color liquid crystal display of the present invention.

On a substrate (lower substrate) 1 on which TFTs are to be formed, is formed common electrodes 2 made from typically aluminum. To suppress occurrence of a failure such as a hillock, a stable oxide film may be formed on the surface of aluminum by anodic oxidation. While not shown, scanning interconnections (functioning as gate electrodes of transistors) are formed simultaneously with formation of the common electrodes 3. An insulating layer 4 is formed thereon. For example, the insulating layer 4 is formed by depositing silicon nitride by CVD (Chemical Vapor Deposition). The insulating layer 4 functions as gate insulating films on the gate electrodes. On the insulating layer 4 are formed pixel electrodes 3 and signal interconnections 21. The formation process involves forming a metal layer made from typically chromium by sputtering, and patterning the metal layer.

Then, black matrixes 14 are formed, and color filters 5 are formed in such a manner as to be matched with a pixel pattern by a method described later. It should be noted that the black matrixes 14 may be formed on the insulating film 4 through a protective film. The color filter 5 is integrally formed between the two common electrodes 2 formed in such a manner as to surround one pixel. In this embodiment, the pixel electrodes 3 are covered with the color filters 5. An orientation control layer 8 is formed on the color filters 5.

In the example shown in FIG. 1, the orientation control layer 8 serves as a function of planarizing irregularities created by formation of the color filters 5 and the black matrixes 14. Besides, in the example shown in FIG. 2, a planarizing layer 7 is formed in such a manner as to be laminated on the orientation control layer 8. In this embodiment, the color filters 5 and black matrixes 14 are formed on the lower (electrode) substrate 1 on which the electrodes 2 and 3 are formed, and accordingly, on a counter substrate 1' is formed only a uniform orientation control layer over the entire surface of a display portion having no fine pattern for each pixel. In this embodiment, each electrode is formed of an opaque metal thin film. In the case of using liquid crystal having a normally closed characteristic, the use of electrodes formed of a transparent metal thin film can ensure a sufficient contrast ratio.

Accordingly, it is possible to eliminate accurate alignment between the upper and lower substrates and hence to significantly improve productivity. While the prior art manner requires alignment between the substrates at an accuracy of about 5 $\mu$m, the present invention little requires alignment between the substrates. As a result, in the case where the panel is formed in accordance with the configuration in this embodiment, it is possible to eliminate the necessity of provision of an aligner for aligning the upper substrate.

Further, it is possible to eliminate the necessity of broadening the width of each black matrix to provide a margin for alignment of the substrates differently from the prior art method, and hence to correspondingly increase a numerical aperture.

In this embodiment, an end portion of each black matrix is placed on the outermost electrode in a display region of one pixel, that is, it does not cover a display portion though which light passes. This is effective to eliminate sacrifice of the numerical aperture of the display region which is provided between the pixel electrode and the common electrode and to which an electric field is applied, and hence to ensure a high numerical aperture. In this case, since the alignment accuracy upon formation of the black matrixes is about 1 $\mu$m, it is possible to eliminate leakage of light due to positional offset if the width of the metal interconnection is 2 μm or more. Actually, since the width of the electrode is at least 4 μm or more depending on the patterning accuracy, such a manner is very effective. In this case, the electrode portion outside an area in which the black matrixes are not formed, also exhibits a function similar to that of the black matrix.

Since this embodiment adopts the horizontal electric field applying method, an increase in drive voltage is not particularly large as compared with the prior art method in which the insulating film is formed integrally with the color filters and black matrixes, so that a low drive voltage characteristic inherent to a liquid crystal material can be kept. Also, it is possible to obtain a significantly wide angle of visibility because of adoption of the horizontal electric field applying method.

Since the orientation control layer 8' formed on the counter substrate 1' can be very thinned, so that the display can be of a substantially flat structure. As a result, it is possible to improve the gap accuracy within the plane of the color liquid crystal display requiring a narrow gap structure, and hence to reduce unevenness of luminance. Hereinafter, the configuration of this embodiment will be more fully described.

Figure 8:
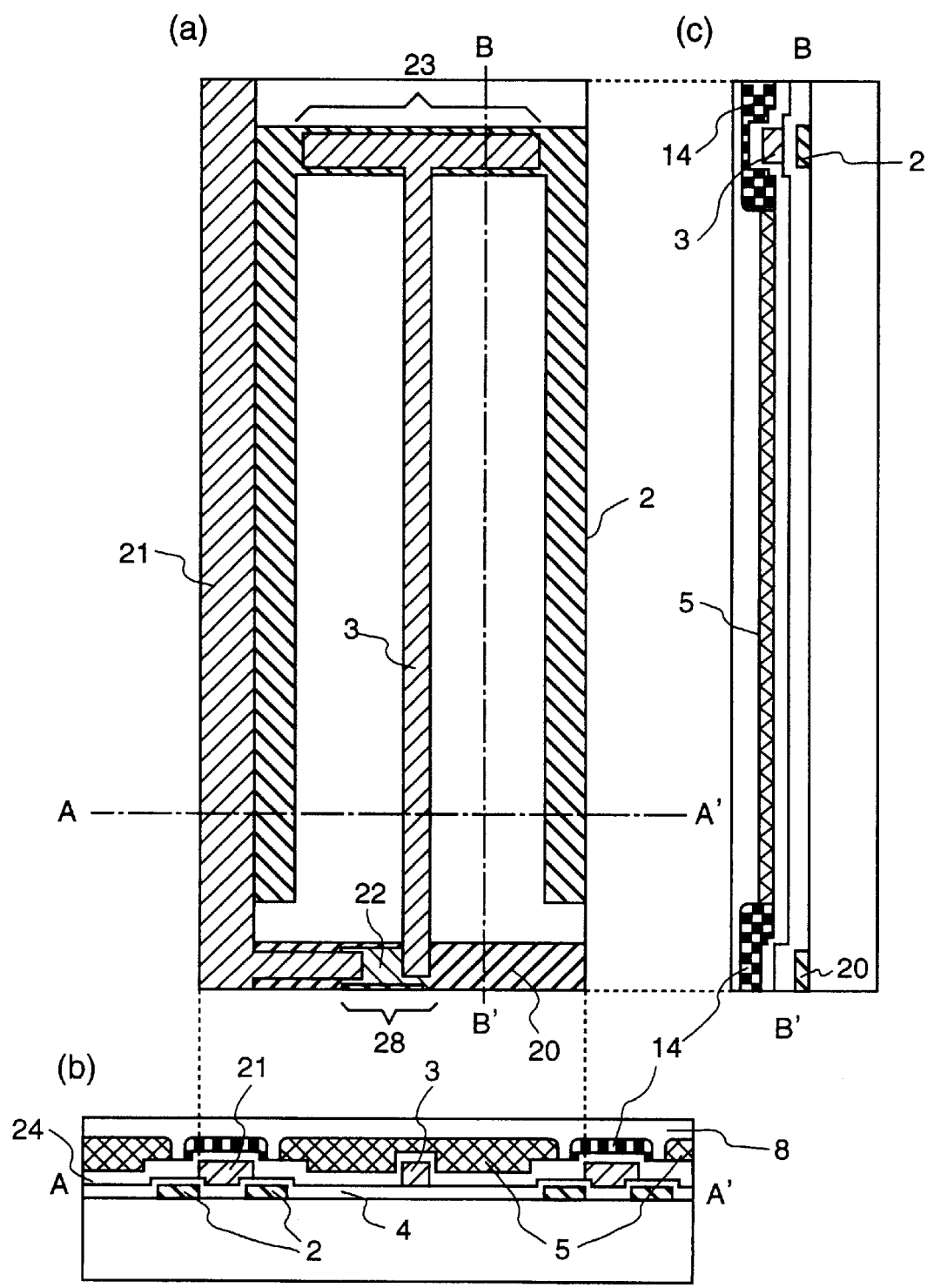
FIG. 8 is a typical view of a unit pixel portion in Embodiment 1.

FIGS. 8(a) to 8(c) shows one example of arrangement of electrodes in a unit pixel portion of the color liquid crystal display of the present invention, wherein FIG. 8(a) is a plan view, and FIGS. 8(a) and 8(b) are sectional views taken on line A–A' and B—B of FIG. 8(a). On a lower (electrode) substrate 1, are formed scanning electrodes 20, signal electrodes 21, common electrodes 2, pixel electrodes 3, and a semiconductor layer 22, for example, TFT elements 29 formed of typically an amorphous silicon layer. The common electrodes 2 and the scanning interconnections 20 are formed of the same metal thin film at the same level and are respectively patterned. Besides, the pixel electrodes 3 and the signal interconnections 21 are formed of the same metal thin film at the same metal thin film at the same level and are respectively patterned. The thickness of each of the common electrode 2 and the scanning interconnection 21 is about 0.2 μm, and the thickness of each of the pixel electrode 3 and the signal interconnection 21 is about 0.5 μm. In a region between the two common electrodes 2, is formed a capacitance element 23 in such a manner that the insulating film (SiN) 4 of the scanning interconnection 20 is held between the pixel electrode 3 and the common electrode 2. The pixel electrode 3 is, as shown in FIG. 8(b), disposed between the two common electrodes 2.

The pixel pitch is 69 μm in the horizontal direction between the signal interconnections 21, and is 207 μm in the vertical direction between the scanning interconnections 20. The width of the pixel is 10 μm in both the horizontal and vertical directions.

Of the pixel electrode 3 and the common electrode 2, partial widths extending in parallel to the signal interconnection 21 (that is, in the longitudinal direction) are as slightly narrow as 5 μm and 8 μm respectively, to thereby improve the numerical aperture.

In this way, the gap between the common electrode 2 and the pixel electrode is set at 20 μm and the length of the opening portion in the longitudinal direction is set at 157 μm. The number of the pixels is set at 320×160 pieces (number of signal electrodes 21: 320 pieces; number of scanning electrodes 20: 160 pieces). With respect to the group of the electrodes on the substrate, each of the common electrode 2 and the scanning electrode 20 is made from aluminum, and each of the signal interconnection 21 and the pixel electrode 3 is made from chromium. It should be noted that each of the above electrodes may be made from a metal having a low resistivity, for example, copper, niobium, an alloy such as a titanium alloy or chromium alloy; and further, it may be formed of a transparent electrode insofar as the liquid crystal exhibits the normally closed characteristic.

The pixel electrodes 3, signal interconnections 21, and channel regions of the TFTs 29 are covered with a insulating layer 24 made from SiN. Then, a photosensitive organic film made from an acrylic resin containing carbon mixed with a black pigment (produced Nippon Kayaku Co., Ltd.: DCF-K series) is formed in a non-display pixel region to a thickness of about 1.0 to 1.5 μm by photolithography, to thus form black matrixes 14.

Figure 7:
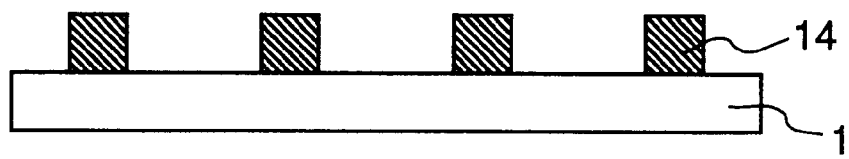
FIG. 7 is a flow chart illustrating a process of fabricating color filters using a horizontal transfer method.
Figure 7:
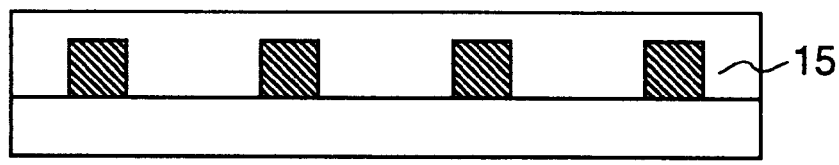
Figure 7:
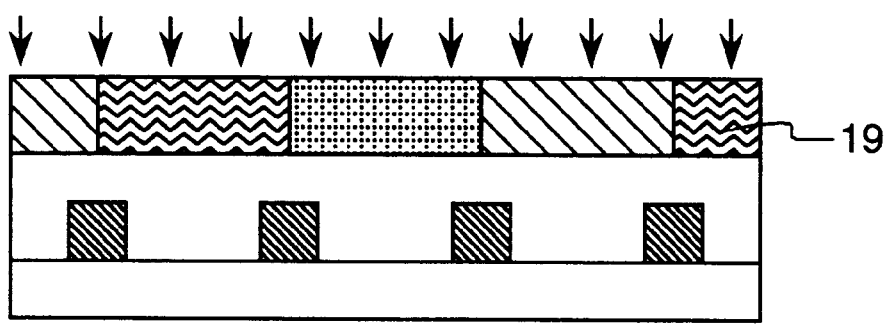
Figure 7:
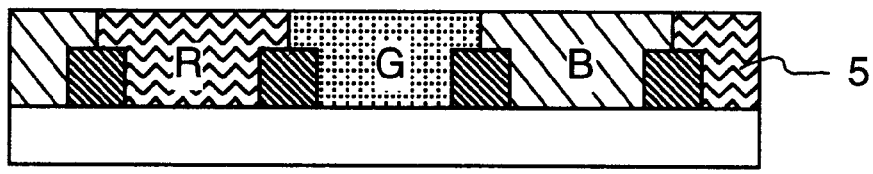

After the group of the electrodes 2, 3, 20, 21, TFTs 28, and black matrixes 14 are thus formed on the lower substrate 1, a photosensitive organic film 15 to be colored, which is made from an acrylic resin (produced Nippon Kayaku Co., Ltd.: CFR series), is applied on the substrate to a thickness of about 1.6 μm. Then, the layer 15 to be colored is formed with a pattern to be colored in three primary colors by one exposure/development step, and is colored by thermal transfer from a film previously coated with a pattern of sublimable dyes of three colors, R, G and B, to thus form color filters 5 (see FIG. 7).

As a resin composition for forming the photosensitive organic film, there can be also used polycarbonate, polyvinyl chloride, polyurethane, polyester, polyamide, polyacrylonitrile, or polycaprolactam. In this embodiment, since a pattern for the layer to be colored is not required to be formed, a non-photosensitive material can be used, for example, polyester resin, cellulose acetate resin, polystyrene, polypropylene, polyethyleneterephthalate or acrlylic resin. In addition, formation of the color filters is not limited to the above coloring by thermal transfer.

The color filters can be formed by a dying method using photolithography, a pigment dispersion method using photolithography in combination with etching, a printing method, or a film transfer method. In the color filters in the present invention, any color layer can be used insofar as it is made from a resin colored with a dye or a pigment.

Further, the method of forming the color filters is not particularly limited. However, since the above group of the electrodes are formed on the TFT side surface, the surface on which the color filters are to be formed is not flat, and accordingly, in order to enhance the flatness by less number of steps, it is desired to use the method of applying the color filters by spin-coat, for example, the dying method, pigment dispersion method or thermal transfer method. of these methods, the dying method and pigment dispersion method are disadvantageous in that the color filters different in color are separately formed and thereby the thicknesses of respective color filter layers become uneven. Consequently, the thermal transfer method in which the color filters different in color can be formed at a time is preferred in terms of simplification of process. In addition, if the flatness of the color filters formed by the dying method, pigment dispersion method or the like is insufficient, there is no problem by forming a planarizing layer on the color filters, although it is added with one step.

Figure 5:
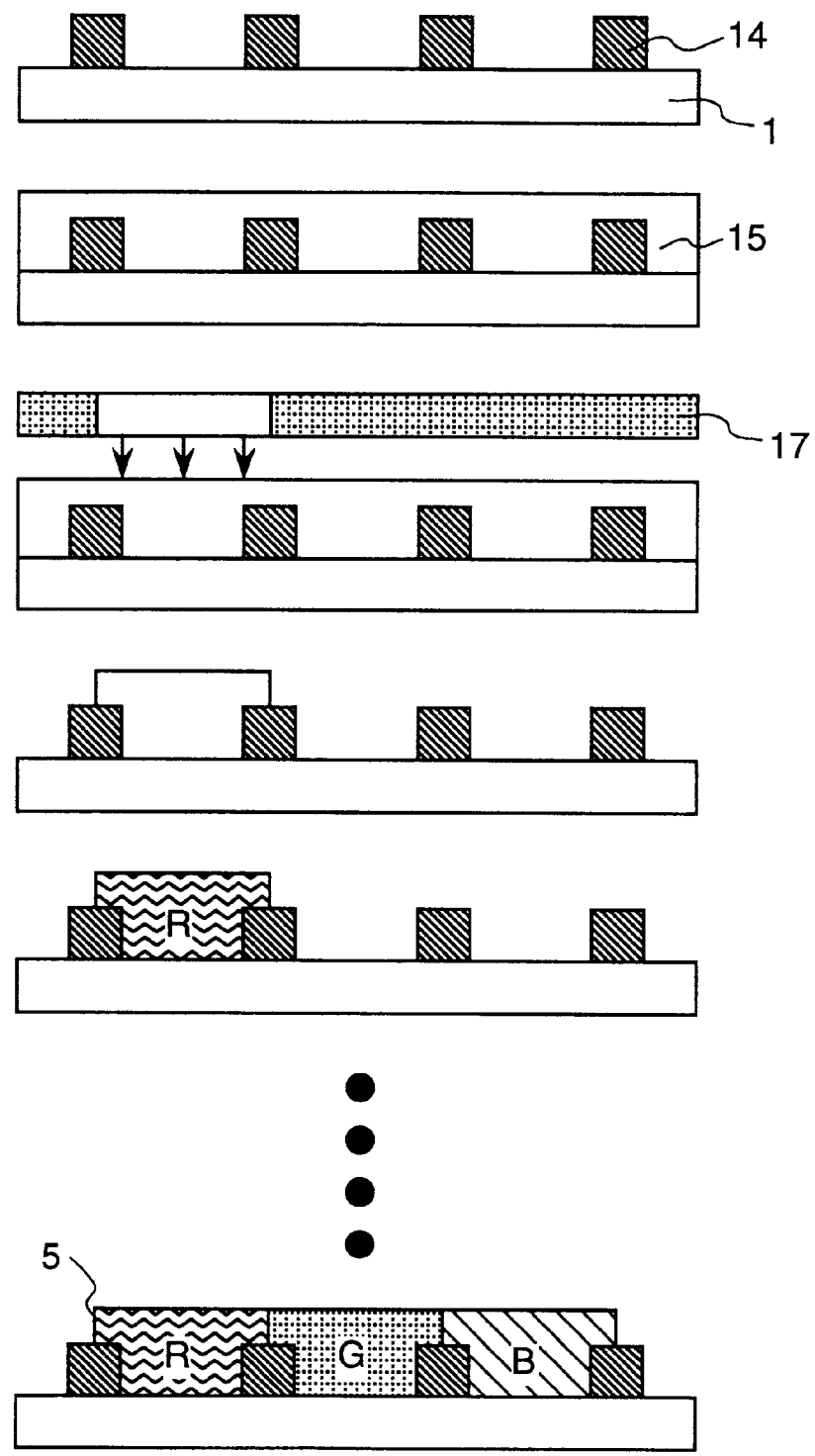
FIG. 5 is a flow chart showing a process of fabricating color filters using a relief dying method.

FIG. 5 shows a process of fabricating color filters by a relief dying method as one example of the dying method. A photosensitive resist 15 to be colored is applied by spin-coat or the like on the lower substrate 1 on which the black matrixes 14 have been formed, followed by exposure and development using a photomask 17 to be patterned in a specific shape, and is dipped in a dying solution to be thus colored. The above step is repeated for each of three colors, R, G and B, to thereby obtain the color filters 5 colored in R, G and B.

Figure 6:
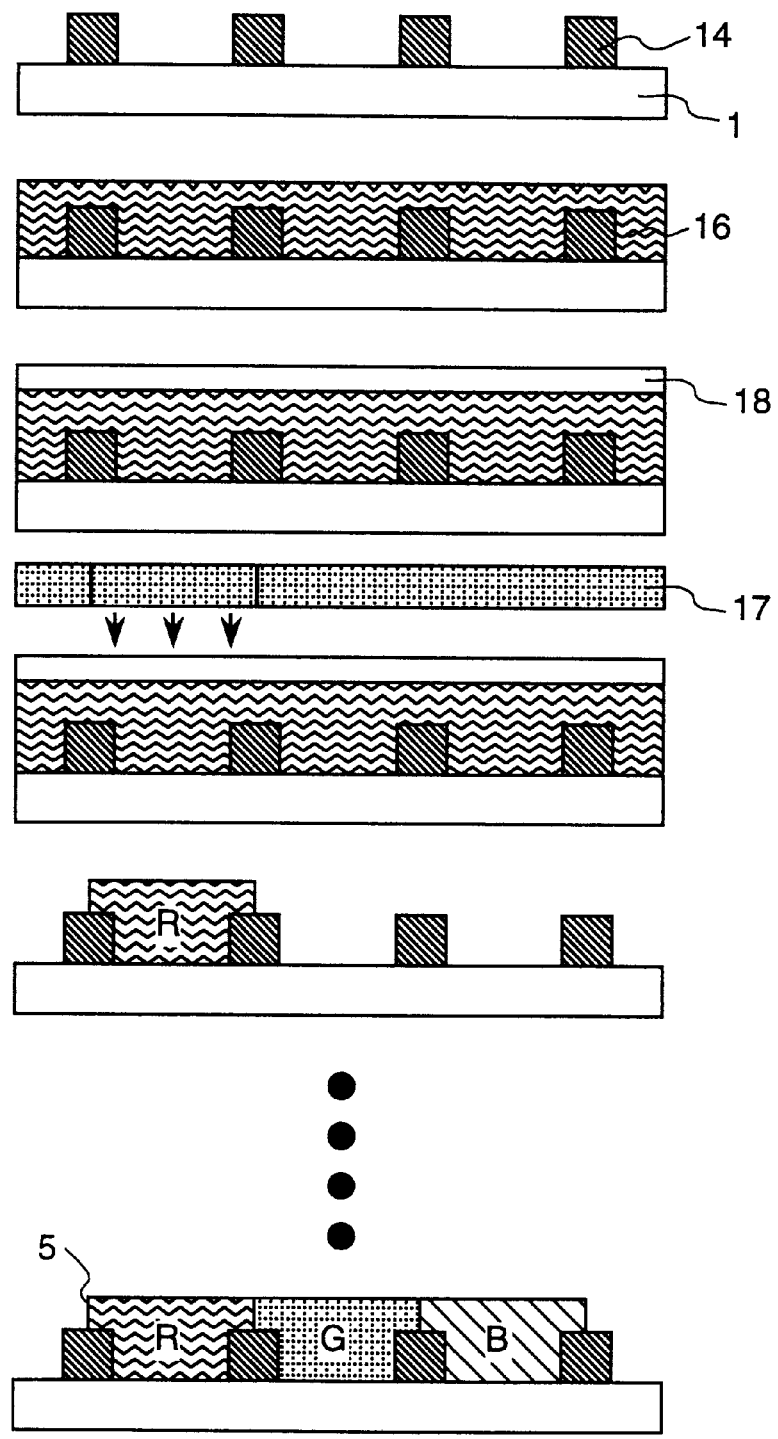
FIG. 6 is a flow chart illustrating a process of fabricating color filters using a pigment dispersion method.

FIG. 6 shows a process of fabricating color filters by the pigment dispersion method using photolithography. Referring to FIG. 6, a photosensitive resist 16 colored by a pigment dispersed therein is applied by spin-coat or the like on the substrate 1 on which the black matrixes have been formed, followed by coating of an oxygen shield film 19 thereon, and are subjected to exposure and development using a photomask 17. The step is repeated three times, to obtain the color filters 5 colored into three colors, R, G and B.

The pigment dispersion method using etching is performed by laminating a resist colored by a pigment dispersed therein and a positive resist, followed by exposure and development, and the positive resist is peeled. The step is repeated three times, to thereby form the color filters 5. In addition, for the pigment dispersion method using photolithography, exposure may be performed from the back surface using, as a photomask for forming the color filters, the group of the electrodes, black matrixes and the like. With this method, by forming the color filters only between the electrodes of the group of the electrodes, the colors of the color filter are divided by the group of electrode and the black matrixes, to thereby prevent mixture of the colors. This method is also effective to simplify the process and hence to improve productivity.

Then, a polyimide film (produced by Hitachi Chemical Co., Ltd.: PIQ-5300) is formed on a surface, being in contact with the liquid crystal layer, of each of the lower substrate 1 and the counter substrate 1' to a thickness of about 0.1 $\mu$m, followed by rubbing, to thus formed an orientation control layer.

Between the upper and lower substrates 1 and 1' is held a fluorine based nematic liquid crystal composition in which a positive anisotropy $\Delta\epsilon$ in dielectric constant is 10 (20° C., 1 kHz) and a double refraction $\Delta n$ is 0.072 (589 nm, 20° C.). The rubbing directions of the upper and lower orientation control layers are substantially in parallel to each other, and are tilted 75° ($\phi L_{c1}=\phi L_{c2}=75°$) with respect to the voltage applying direction.

Polymer beads (produced by Sekisui Fine Chemical, Co., Ltd.: Micro-pearl) mainly containing divinylbenzene, which are formed in spherical shapes each having a particle size of 4.0 $\mu$m, are dispersed and held between the substrates. Thus, the cell gap d is set at 4.0 $\mu$m. As a result, the value of $\Delta n \times d$ becomes 0.29 $\mu$m.

Next, the above element is held between two planarizing plates 9 and 9' (produced by NITTO DENKO CORPORATION: GI220DU). The light transmission axis of the planarizing plate 9 is set to be substantially in parallel to the rubbing direction, that is, $\phi_{p1}=75°$, while the light transmission axis of the polarizing plate 9' is set to be perpendicular to that of the polarizing plate 9, that is, $\phi_{p2}=-15°$. Thus, there can be obtained a color liquid crystal display having a normally closed characteristic.

In this embodiment, by planarizing the substrate, a spacer material having a large particle size can be used for the same thickness of the liquid crystal layer, and thereby the uniformity of the particle size of the spacer material is increased, thereby improving the gap accuracy. Further, one of the orientation control layers may be made from a photosensitive polymer. This is effective to reduce the number of the heating/hardening steps in the layer formation process, and hence to prevent occurrence of strain due to thermal stress caused by heat-treatment. This makes it possible to provide a high quality liquid crystal display without a failure at a high yield.

As a result of measuring the gap within the cell plane of the liquid crystal display in this embodiment using an optical interference method, it is found that the gap accuracy within the display plane is in a range of 4.00±0.07 $\mu$m. Thus, there can be obtained a color liquid crystal display without occurrence of unevenness of display due to a gap failure.

Figure 9:
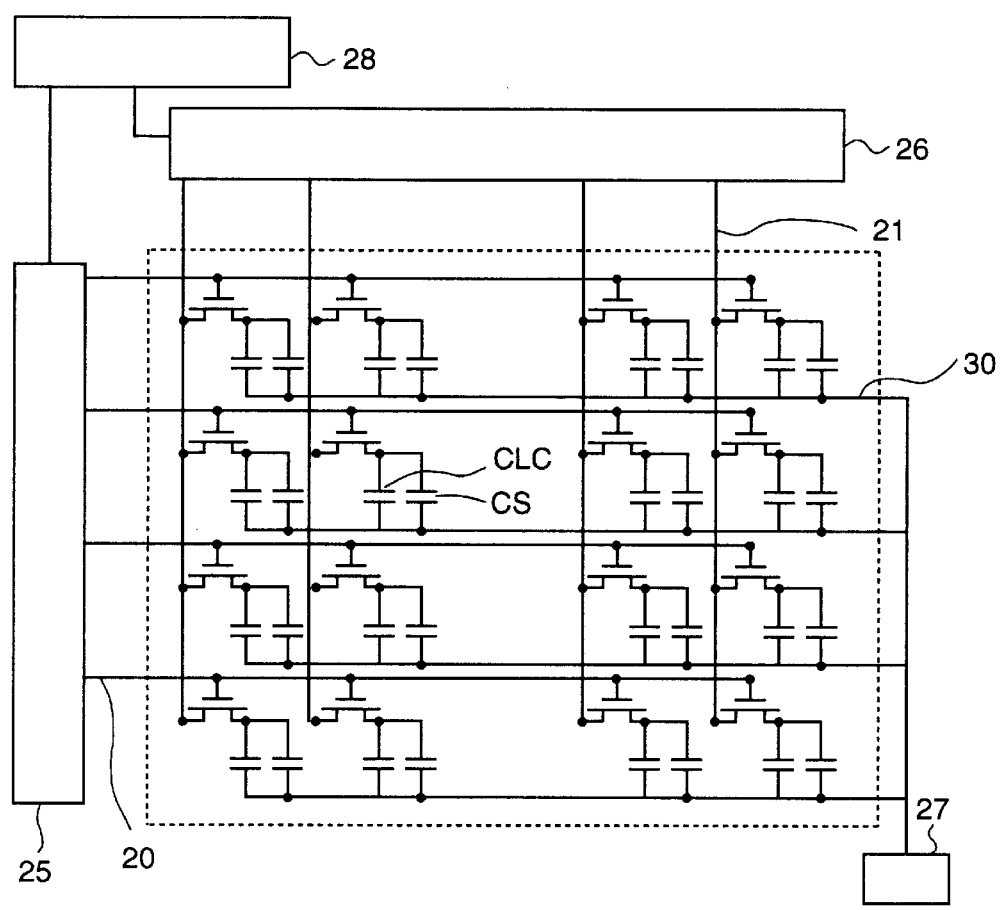
FIG. 9 is a view showing one example of a system configuration of the liquid crystal display of the present invention.

The schematic configuration of the liquid crystal display of the present invention is shown in FIG. 9. Referring to this figure, a scanning signal and a video signal are supplied to each TFT from a vertical scanning signal circuit 25 and a video signal circuit 26. A plurality of signal interconnections 21 and scanning interconnections 20 cross in a matrix, to form pixels in regions surrounded by these interconnections. Common interconnections 30 extend over a plurality of the pixels, and are connected to common electrodes (not shown) in the pixels. A common electrode drive circuit 27 is connected to the common interconnections 30. Further, a scanning signal voltage, a video signal voltage, and a timing signal are supplied through a controller 28 to the vertical scanning signal circuit 25 and the video signal circuit 26.

Embodiment 2

Figure 10:
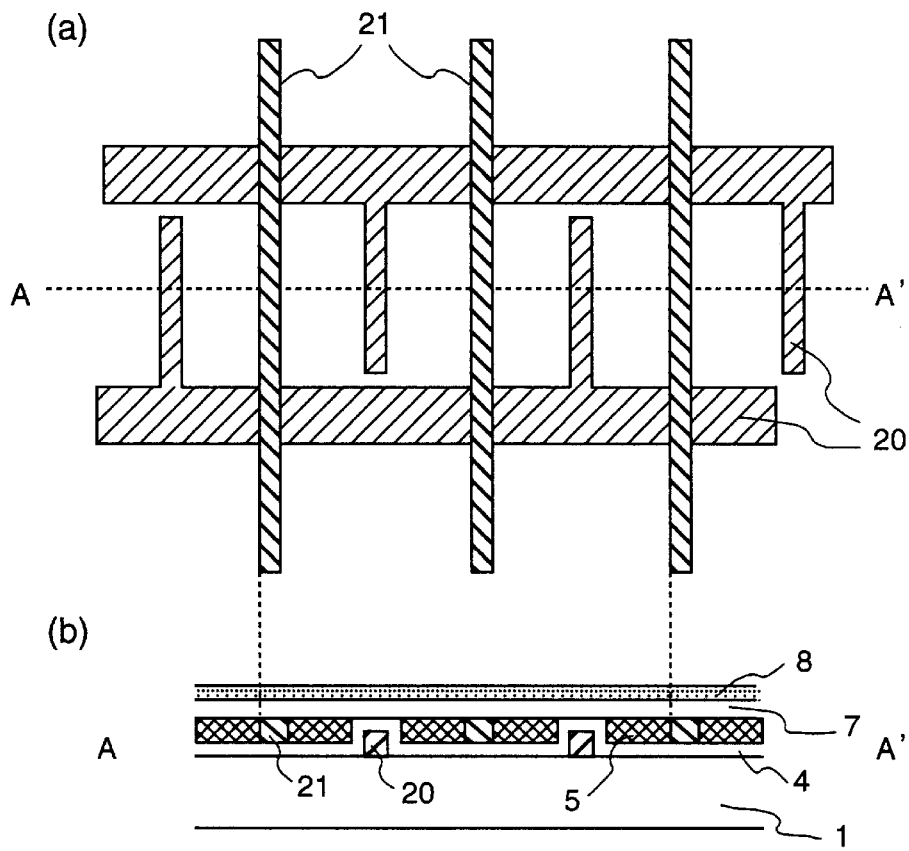

FIGS. 10(a) and 10(b) show one embodiment of a color liquid crystal display of a simple matrix type according to the present invention, wherein FIG. 10(a) is a plan view showing a unit pixel portion, and FIG. 10(b) is a sectional view taken on line A—A of FIG. 10(a).

As each of substrates 1 and 1', there is used a glass substrate having a thickness of 1.1 mm. The surface of the glass substrate is polished. Scanning interconnections 20 and signal interconnections 21 are formed on the lower substrate 1. An electric field can be applied to liquid crystal through the interconnections 20 and 21.

As shown in FIG. 10(a), the signal interconnection 21 is formed in a stripe shape, and the scanning interconnection 20 has a portion substantially parallel to the signal interconnection 21. The size of one pixel is set at 280×240 $\mu$m, and an interval between the signal interconnection 21 and the scanning interconnection 20 is set at 20 $\mu$m. The thickness of each interconnection is seta at 0.5 $\mu$m. An insulating layer 4 made from a transparent polymer represented by epoxy resin is formed between the scanning interconnections 20 and the signal interconnections 21. Each of the interconnections 20 and 21 is formed of an aluminum layer having a width of 5 $\mu$m in the same manner as described in the prior art active matrix type liquid crystal display; however, it may be made from a different material such as chromium or copper insofar as it has a low electric resistance.

A photosensitive layer to be colored (produced by Nippon Kayaku Co., Ltd.: CFR series) is applied on the lower substrate 1 to a thickness of about 1.0 $\mu$m, and irradiated with ultraviolet rays from the back surface of the substrate using the group of the electrodes as a mask pattern, followed by development, to form a pattern to be colored in three primary colors. The portion of the layer masked by the group of the electrodes is removed at the development step, to thus obtain a layer having a pattern to be colored, which is good in flatness. The layer to be colored is then colored by thermal transfer from a film previously coated with a pattern of sublimable dyes of the three primary colors R, G and B, to thus form the color filters 5.

Further, a planarizing layer 7 made from a transparent epoxy resin is formed on the substrate to a thickness of about 1 μm by spin-coat. Then, a polyimide film (produced by Hitachi Chemical Co., Ltd.: PIQ-5300) is formed on a surface, being in contact with the liquid crystal layer, of each of the lower substrate 1 and the counter substrate 1' to a thickness of about 0.1 μm, followed by rubbing, to thus form orientation control layer 8 and 8'.

Between the upper and lower substrates 1 and 1' is held a fluorine based nematic liquid crystal composition in which a positive anisotropy Δε in dielectric constant is 10 and a double refraction Δn of 0.072 (589 nm, 20° C.). The rubbing directions of the upper and lower orientation control layers 8 and 8' are substantially in parallel to each other, and are tilted 5° ($\phi L_{c1} = \phi L_{c2} = 105°$) with respect to the voltage applying direction.

Polymer beads formed in spherical shapes each having a particle size of 4.4 μm are dispersed and held between the substrates. Thus, the cell gap d is set at 4.4 μm. As a result, the value of Δn×d becomes 0.32 μm.

Next, the above element is held between two planarizing plates 9 and 9'. The light transmission axis of the planarizing plate 9 is set to be substantially in parallel to the rubbing direction, that is, $\phi_{p1} = 105°$, while the light transmission axis of the polarizing plate 9' is set to be perpendicular to that of the polarizing plate 9, that is, $\phi_{p2} = 15°$. Thus, there can be obtained a color liquid crystal display having a normally closed characteristic. In addition, a LSi for driving the liquid crystal is connected to the display.

As a result of measuring the gap plane of the liquid crystal display obtained in this embodiment using an optical interference method, it is found that the gap accuracy within the display plane is in a range of 4.40±0.07 μm, and consequently, there can be obtained a color liquid crystal display exhibiting a wide angle of visibility and also no unevenness of display due to a gap failure.

Embodiment 3

This embodiment is the same as Embodiment 1, except for the following configuration.

Like Embodiment 1, a group of electrodes, black matrixes, color filters are formed on a lower substrate 1, and then a planarizing protective film made from an acrylic resin is formed to a thickness of about 1.0 μm in such a manner as to cover the substrate. The color filters are formed by the pigment dispersion method using photolithography. An orientation control layer 8 is formed on the substrate in the same manner as in Embodiment 1, and a fluorine based nematic liquid crystal composition in which a positive anisotropy Δε in dielectric constant is 10 and a double refraction Δn is 0.072 (589 nm, 20° C.) is held between the upper and lower substrates, to obtain a liquid crystal display having a gap of 4.2 μm (Δn×d =0.30 μm).

As a result of measuring the gap plane of the liquid crystal display obtained in this embodiment using an optical interference method, it is found that the gap accuracy within the display plane is further improved, that is, it is in a range of 4.20±0.04 μm. Thus, there can be obtained a color liquid crystal without occurrence of unevenness of display due to a gap failure.

Embodiment 4

This embodiment is the same as Embodiment 1, except for the following configuration.

Like Embodiment 1, a group of electrodes, black matrixes are formed on a lower substrate 1, and a photosensitive resist made from polyvinylalcohol added with dichromic acid is applied on the substrate by spin-coat, followed by exposure, development and dying. The step is repeated three times, to form color filters 5 of three colors, R, G and B to a thickness of about 1.8 μm between pixel electrodes 3 and common electrodes 2.

An acrylic resin film is formed to a thickness of about 0.2 μm on surfaces, being in contact with liquid crystal, of the substrate 1 and a counter substrate 1', followed by rubbing, to form orientation control layers 8 and 8'. Between the upper and lower substrates 1 and 1' is held a fluorine based nematic liquid crystal composition in which a positive anisotropy Δε in dielectric constant is 10 and a double refraction Δn is 0.072 (589 nm, 20° C.), to obtain a liquid crystal display having a gap of 4.1 μm (Δn×d=0.31 μm).

As a result of measuring the gap plane of the liquid crystal display obtained in this embodiment using an optical interference method, it is found that the gap accuracy within the display plane is in a range of 4.10±0.05 μm. Thus, there can be obtained a color liquid crystal without occurrence of unevenness of display due to a gap failure.

Embodiment 5

This embodiment is the same as Embodiment 2, except for the following configuration.

After formation of signal electrodes 21 and scanning electrodes 20, a photosensitive resist made from polyvinylalcohol added with dichromic acid is applied on the substrate by spin-coat, followed by exposure, development and dying. The step is repeated three times, to form color filters 5 of three colors, R, G and B to a thickness of about 1.5 μm between the scanning electrodes 20 and the signal electrodes 21. Then, a polyimide film (produced by Hitachi Chemical Co., Ltd: PIQ-5300) is formed on each of the substrate 1 and a counter substrate 1' to a thickness of about 0.1 μm, followed by rubbing, to form orientation control layers 8 and 8'.

As a result of measuring the gap plane of the liquid crystal display obtained in this embodiment using an optical interference method, it is found that the gap accuracy within the display plane is in a range of 4.00±0.06 μm. Thus, there can be obtained a color liquid crystal exhibiting a wide angle of visibility and having no unevenness of display due to a gap failure.

COMPARATIVE EXAMPLE

This comparative example is the same as Embodiment 1, except for the following configuration.

Figure 11:
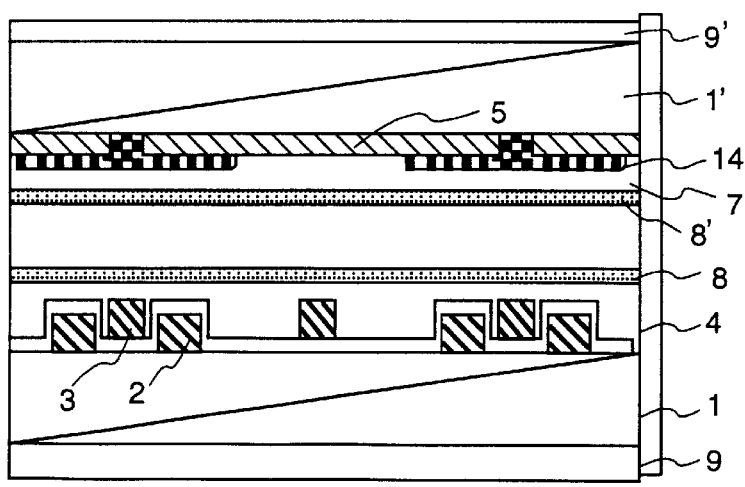

FIG. 11 is a typical sectional view of a unit pixel portion of a color liquid crystal display in this comparative example.

Like Embodiment 1, pixel electrodes 3, signal interconnections 21, scanning interconnections 20, common electrodes 2, and TFTs 29 are formed on a lower substrate 1, and the pixel electrodes 3, signal interconnections 21, and channel regions of the TFTs are covered with an insulating layer 24 made from SiN.

On the other hand, in a non-display pixel region of a counter substrate 1', is formed a photosensitive organic film containing carbon mixed with a black pigment (produced by Nippon Kayaku Co., Ltd: DCF-K series) to a thickness of about 1.0 to 1.5 μm by photolithography, to thus form black matrixes 14. Then, a photosensitive layer to be colored (produced by Nippon Kayaku Co. Ltd.: CFR series) is formed on the substrate to a thickness of about 1.5 μm, to be formed with a pattern to be colored at one exposure/ development step. The layer to be colored is then colored by thermal transfer from a film previously coated with a pattern of sublimable dyes of three colors, R, G and B, to thus form color filters 5.

A planarizing layer 7 made from transparent epoxy resin is formed on the color filters to a thickness of about 2 μm by spin-coat, and then a polyimide film produced by Hitachi Chemical Co., Ltd: PIQ-5300) is formed to a thickness of about 0.1 μm on each of the lower substrate 1 and the counter substrate 1' formed with the color filters, followed by rubbing, to form orientation control layers 8 and 8'.

Between the upper and lower substrates is held a fluorine based nematic liquid crystal composition in which a positive anisotropy $\Delta\epsilon$ in dielectric constant is 10 and a double refraction $\Delta n$ is 0.072 (589 nm, 20° C.). The rubbing directions of the upper and lower orientation control layers are substantially in parallel to each other, and are tilted 85° ($\phi L_{c1}=\phi L_{c2}=85°$) with respect to the voltage applying direction.

Polymer beads (produced by Sekisui Fine Chemical, Co., Ltd.: Micro-pearl) mainly containing divinylbenzene, which are formed in spherical shapes each having a particle size of 3.8 μm, are dispersed and held between the substrates, to obtain a liquid crystal display having a cell gap d of 4.0 μm ($\Delta n \times d=0.29$ μm).

Next, the above liquid crystal display is held between planarizing plates (produced by NITTO DENKO CORPORATION: GI220DU). The light transmission axis of one planarizing plate is set to be substantially in parallel to the rubbing direction, that is, $\phi_{p1}=85°$, while the light transmission axis of the other polarizing plate is set to be perpendicular to that of the above polarizing plate, that is, $\phi_{p2}=-5°$. Thus, there can be obtained a color liquid crystal display having a normally closed characteristic.

In the liquid crystal display obtained in this comparative example, alignment between the upper and lower substrates is required, and thereby the productivity is low. Also since the size of the matrix is designed at a larger value at the sacrifice of part of the display region on assumption of an inevitable deviation in alignment, the numerical aperture is reduced. Further, since each of the upper and lower substrates has steps, the gap accuracy becomes a value in a range of 4.00±0.30 μm, as a result of which there occurs unevenness in display due to a gap failure over the entire surface of the display portion.

As described above, according to the present invention, by forming color filters for color display and black matrixes for improving a color purity and contrast ratio on a substrate on which active matrix elements for switching liquid crystal and a group of electrodes are formed, it is possible to provide a color liquid crystal display in which a high productivity, a high numerical aperture, a low drive voltage, and a wide angle of visibility are achieved and also unevenness in luminance is reduced.

Industrial Applicability

As described above, the color liquid crystal display of the present invention reduces unevenness in luminance and ensures a high numerical aperture and also it is useful for improvement of productivity.

What is claimed is:

1. A color liquid crystal display device having a pair of substrates, at least one of which is transparent, and a liquid crystal layer held between said pair of substrates, characterized in that one of said pair of substrates includes a plurality of common electrodes, a plurality of pixel electrodes disposed between said plurality of common electrodes, color filters respectively disposed between said plurality of common electrodes and said plurality of pixel electrodes, and an orientation control layer disposed directly on said color filters for controlling orientation of liquid crystal molecules in said liquid crystal layer; and an electric field parallel to said substrates is generated in said liquid crystal layer by a voltage applied between said common electrodes and said pixel electrodes.

2. A color liquid crystal display device according to claim 1, wherein black matrixes for shading boundaries of said color filters are formed on said one substrate.

3. A color liquid crystal display device according to claim 1, wherein said color filters are formed through an insulating film formed on said one substrate.

4. A color liquid crystal display device according to claim 3, wherein said color filters are formed in such a manner as to cover said pixel electrodes.

5. A color liquid crystal display device according to claim 1, wherein said common electrodes are formed at a layer different from that of said pixel electrodes through an insulating film formed on said one substrate.

6. A color liquid crystal display device according to claim 1, wherein, where d is a thickness of said liquid crystal layer and $\Delta n$ is the anisotropy in refractive index, the product $\Delta n \times d$ is in a range of 0.21 to 0.37 μm.

7. A color liquid crystal display device according to claim 1, wherein said orientation control layer is formed of an organic polymer film.

8. A color liquid crystal display device according to claim 1, wherein at least one of said color filter and said orientation control layer formed of a photosensitive polymer.

9. A color liquid crystal display device comprising:

a pair of substrates, at least one of which is transparent, and a liquid crystal layer held between said pair of substrates;

a plurality of scanning interconnections, a plurality of signal interconnections crossing said scanning interconnections in a matrix arrangement, and a plurality of thin film transistors formed in such a manner as to correspond to crossing points between said scanning interconnections and said signal interconnections which are formed on one of said pair of substrates;

pixels defined by regions surrounded by said plurality of scanning interconnections and said plurality of signal interconnections, each of said pixels having a plurality of common electrodes connected to a common interconnection for connecting a number of said pixels to each other and at least one pixel electrode disposed between said common electrodes and connected to a corresponding one of said thin film transistors, adjacent ones of said plurality of common electrodes being disposed in such a manner as to surround a corresponding one of said signal interconnections between adjacent ones of said pixels;

respective color filters formed between said plurality of common electrodes and said pixel electrode;

an orientation control layer disposed directly on said color filters for controlling orientation of liquid crystal molecules of said liquid crystal layer; and respective black matrixes being formed on one of said plurality of signal interconnections and ones of said common electrodes adjacent to said one signal interconnection;

wherein an electric field parallel to said substrates is generated in said liquid crystal layer by applying a voltage between said common electrodes and said pixel electrodes.

10. A color liquid crystal display device according to claim 9, wherein said color filters are disposed between said black matrixes in such a manner as to cover said pixel electrodes.

11. A color liquid crystal display device according to claim 9, wherein said color filters are formed through an insulating film formed on said one substrate.

12. A color liquid crystal display device according to claim 9, wherein said scanning interconnections and said common electrodes are formed at the same layer on said one substrate.

13. A color liquid crystal display device according to claim 9, wherein said pixel electrodes and said signal interconnections are formed on an insulating film formed on said one substrate.

14. A color liquid crystal display device according to claim 9, wherein said liquid crystal layer is formed such that where d is a thickness of said liquid crystal layer and $\Delta n$ is the anisotropy in refractive index, the product $\Delta n \times d$ is in a range of 0.21 to 0.37 $\mu$m.

15. A color liquid crystal display device according to claim 9, wherein said orientation control layer is formed of an organic polymer film.

16. A color liquid crystal display device according to claim 9, wherein at least one of said color filter and said orientation control layer is formed of a photosensitive polymer.

* * * * *